United States Patent
Lohr et al.

(10) Patent No.: US 12,478,836 B2
(45) Date of Patent: Nov. 25, 2025

(54) SYSTEMS AND METHODS FOR TRACKING AND REPORTING CLIMBING PROGRESS

(71) Applicant: Pebble LLC, Salt Lake City, UT (US)

(72) Inventors: Sundev R. Lohr, Salt Lake City, UT (US); Dustin G. Buckthal, Salt Lake City, UT (US)

(73) Assignee: PEBBLE LLC, Salt Lake City, UT (US)

( * ) Notice: Subject to any disclaimer, the term of this patent is extended or adjusted under 35 U.S.C. 154(b) by 245 days.

(21) Appl. No.: 18/132,112

(22) Filed: Apr. 7, 2023

(65) Prior Publication Data

US 2023/0321490 A1 Oct. 12, 2023

Related U.S. Application Data

(60) Provisional application No. 63/328,930, filed on Apr. 8, 2022.

(51) Int. Cl.
*A63B 24/00* (2006.01)

(52) U.S. Cl.
CPC ...... *A63B 24/0062* (2013.01); *A63B 24/0075* (2013.01); *A63B 2220/803* (2013.01); *A63B 2220/806* (2013.01); *A63B 2225/54* (2013.01)

(58) Field of Classification Search
CPC ............ A63B 24/0062; A63B 24/0075; A63B 2220/803; A63B 2220/806; A63B 2225/54; A63B 69/0048; A63B 2024/0015; G06Q 10/20; G06Q 30/0207; G06Q 30/0267; G06Q 50/01; G06Q 10/0639; G06V 40/23; G09B 19/0038
See application file for complete search history.

(56) References Cited

U.S. PATENT DOCUMENTS

| | | | | |
|---|---|---|---|---|
| 2016/0299230 A1* | 10/2016 | Morris | ............. | G01C 21/20 |
| 2017/0056724 A1* | 3/2017 | Baker | ............. | G01S 19/19 |
| 2019/0139391 A1* | 5/2019 | Lee | ............. | G08B 21/0453 |
| 2019/0176011 A1* | 6/2019 | Lehrer | ............. | A63B 71/0622 |
| 2019/0340301 A1* | 11/2019 | Mosak | ............. | H04L 67/306 |
| 2021/0275888 A1* | 9/2021 | Speed | ............. | A63B 69/0048 |
| 2024/0104927 A1* | 3/2024 | Tsurumi | ............. | G06V 20/17 |
| 2024/0305136 A1* | 9/2024 | Nakanishi | ............. | H02J 50/90 |
| 2024/0335700 A1* | 10/2024 | Carruthers | ............. | A63B 21/225 |

* cited by examiner

*Primary Examiner* — Amine Benlagsir
(74) *Attorney, Agent, or Firm* — Parsons Behle & Latimer

(57) ABSTRACT

A system for tracking a user's progress through a climb. The system including a transmitter that wirelessly transmits a user identification (user ID), a scanning device that receives the wirelessly transmitted user ID and communicates climb data comprising the user ID and a route climb identifier to at least one server device comprising instructions to cause the least one server device and related data processing and storage apparatus to operate to store the climb data, and wherein the server device further comprises instructions to enable communication of the stored climb data to a user device.

16 Claims, 10 Drawing Sheets

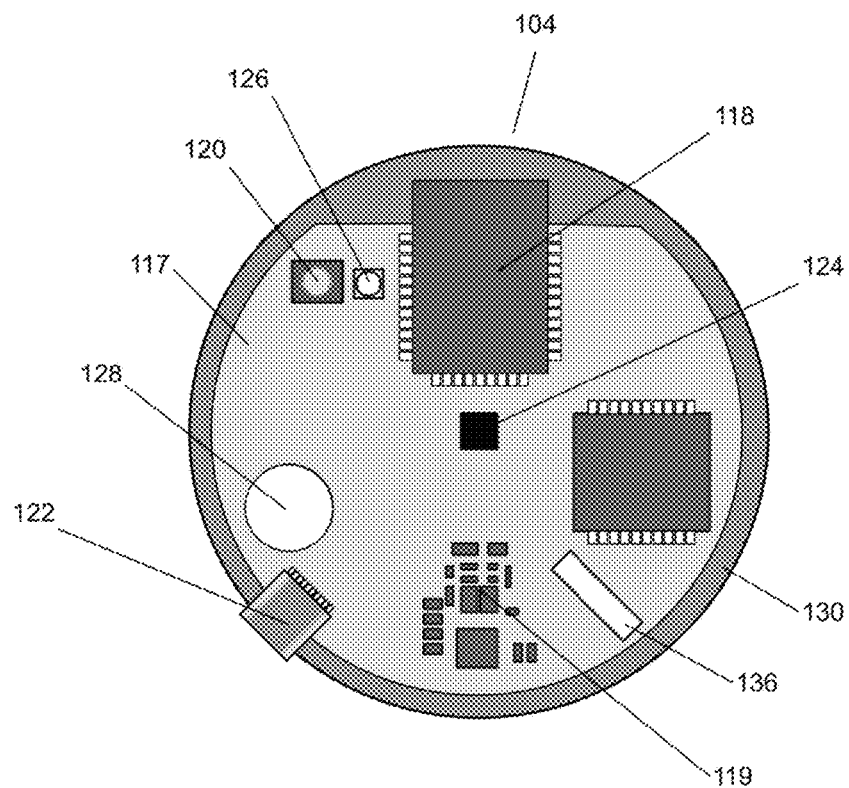
FIG. 2B
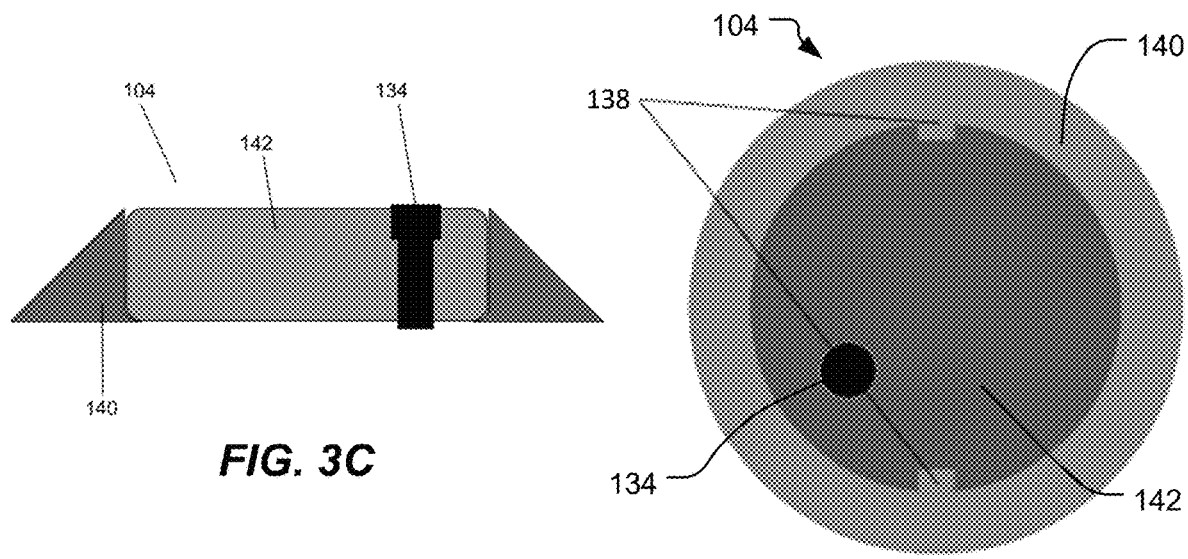
FIG. 3C
FIG. 3B

SYSTEMS AND METHODS FOR TRACKING AND REPORTING CLIMBING PROGRESS

CROSS-REFERENCE TO RELATED APPLICATIONS

This application, under 35 U.S.C. § 119, claims the benefit of U.S. Provisional Patent Application Ser. No. 63/328,930 filed on Apr. 8, 2022, and entitled "Pebble Ascent Logging," the contents of which are hereby incorporated by reference herein.

FIELD OF THE DISCLOSURE

This disclosure relates to systems and methods for tracking a participant's progress along a route. In particular, this disclosure relates to systems and methods for tracking and recording a climber's progress along a climbing route.

BACKGROUND

Climbers and other sports and activity enthusiasts typically care about whether they successfully complete a climbing route, a running race, a hiking trail, a swimming event, a cycling course, or the like. While some existing smartphone and smart watch devices may enable such route tracking, they typically require carrying the smartphone, which may be impractical or ill-advised (e.g., while swimming). Likewise, existing watches or phones cannot effectively track rock climbing, particularly indoors. For example, the GPS that existing phones or watches used does not work inside and there is no way for a watch or phone to know what climb is being attempted. Further, even existing phone apps that allow logging climbs, typically require accessing the app and finding the climb. This can be inconvenient when a gym has many (often more than 100) routes. Other problems with smart devices include damage to those devices from falls, abrasion, etc., potential entanglement in other equipment inhibiting movement or reducing safety (e.g., ropes, carabiners, belay devices, etc.), potential for injury to others below a climber due to dropping a phone, potential distraction from phone-linked watch alert (e.g., texts), additional and unnecessary weight, and risk of loss (e.g., in outdoor environments). Other drawbacks, inconveniences, and impracticalities also exist.

Additionally, even in controlled (i.e., indoor) climbing activities it is desirable to use relatively easy and simple systems to, for example, have members check-in to the gym, check in for things like events, to allow access to other areas of the gym, or the like. Likewise, it would be advantageous to have systems and methods in place to provide a user safety check or confirmation prior to attempting a particular rock climb, such as verification of the climber's qualifications to attempt a certain type of climb (e.g., lead climbing) and a belayer's qualification to belay, or interactions with auto-belay devices to verify proper set up prior to climbing. Existing systems and methods fail to provide these, and other, advantages and conveniences. Other drawbacks, disadvantages, and inconveniences also exist with current systems and methods.

SUMMARY

Accordingly, the herein disclosed embodiments address the above, and other, drawbacks, disadvantages, and inconveniences that exist with current systems and methods. As used herein, the terms "climbing route," "route," "climb", and "climbs" interchangeably refer to any type of climbing path such as, but not limited to, traditional climbing routes, sport climbing routes, top-rope climbing routes, lead climbing routes, outdoor climbing routes, gym climbing routes, bouldering problems, bouldering circuits, slab climbs, overhang climbs, roof climbs, arete climbs, and the like. Disclosed embodiments include systems for tracking a user's progress through a climb, the system including a transmitter that wirelessly transmits a user identification (user ID), a scanning device that receives the wirelessly transmitted user ID and communicates climb data comprising the user ID and a route climb identifier to at least one server device comprising instructions to cause the least one server device and related data processing and storage apparatus to operate to store the climb data, and wherein the server device further comprises instructions to enable communication of the stored climb data to a user device.

In some embodiments the transmitter includes a radio frequency identification (RFID) transmitter. In some embodiments the transmitter includes a wristband.

In some embodiments the climb data further comprises one or more of a date, a time of day, an elapsed time of completion of the climb, or a rating or difficulty indicator of climb.

In some embodiments the system includes at least one camera that communicates images related to the user's progress through the climb to the at least one server device.

In some embodiments the scanning device communicates with the at least one server with a long-range radio (LORA) transmitter.

In some embodiments the system includes a power conservation circuit that comprises a proximity sensor. In some embodiments the proximity sensor powers on the scanning device when motion is detected by the proximity sensor. In some embodiments the proximity sensor powers off the scanning device when motion is not detected by the proximity sensor for a predetermined time-period.

In some embodiments the climb data further includes one or more of safety check information, belayer qualification information, or equipment setup information.

In some embodiments the at least one server device further comprises instructions to cause the least one server device and related data processing and storage apparatus to operate to process the user ID to track the number of climbers using the system.

In some embodiments the at least one server device further comprises instructions to cause the least one server device and related data processing and storage apparatus to operate to process the user ID and climb data to provide one or more of recommendations for climbs, rewards, or advertising.

In some embodiments the at least one server device further comprises instructions to cause the least one server device and related data processing and storage apparatus to operate to process aggregate climb data for route planning and setting or maintenance and equipment monitoring.

In some embodiments the scanning device further comprises a mounting ring that secures a modular scanner in place.

In some embodiments the scanning device further comprises a climb grade code indicator. Other embodiments also exist.

BRIEF DESCRIPTION OF THE DRAWINGS

FIG. 2B is another embodiment of circuit board 117 in accordance with disclosed embodiments.

FIG. 3B is a schematic front view of a scanning device 104 with a ring-type configuration in accordance with disclosed embodiments.

FIG. 3C is a cross-sectional view of the scanning device 104 of FIG. 3B in accordance with disclosed embodiments.

Figure 1:
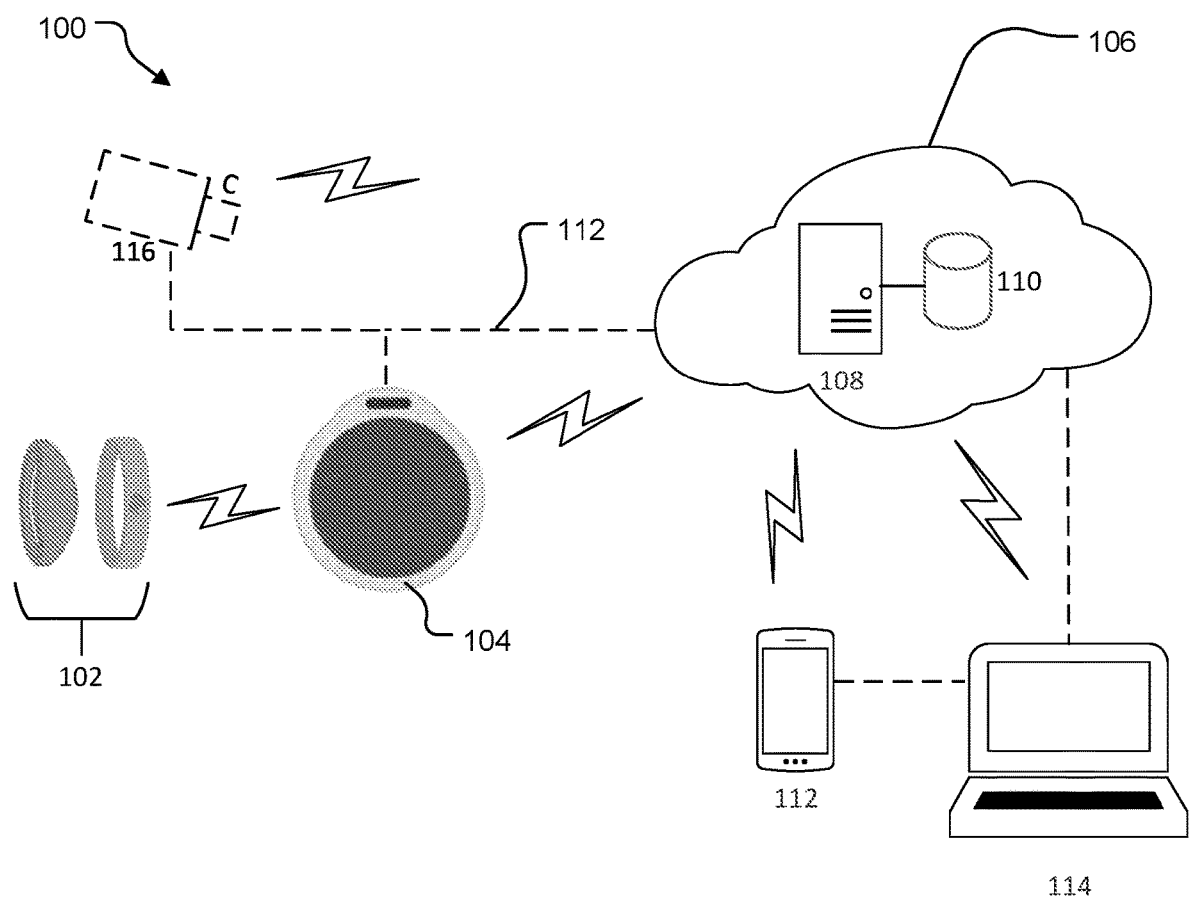
FIG. 1 is a schematic illustration of a climbing progress tracker system in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic illustration of a climbing progress tracker system 100 in accordance with disclosed embodiments. As illustrated, a climber or other user wears a wristband, tag, fob, card, necklace, or the like, collectively identified herein as wristband 102, containing a radio frequency identification (RFID) or other near-field communication (NFC) device inside. Two exemplary embodiments of wristbands 102 are shown in FIG. 1. Wristbands 102 are relatively inexpensive and known by those of ordinary skill in the art to be used, for example, at festivals and other events to enable admittance of users and the like and are sized to not interfere with climbing activities. As noted other form factors are also usable.

As also illustrated system 100 includes an exemplary scanning device 104. Embodiments of scanning device 104 are attachable to, for example, a climbing wall (not illustrated), typically at the bottom or start of a climb. When a climber or other user brings their wristband 102 near to the scanning device 104, the scanning device 104 wirelessly reads the RFID or other NFC identifier of the wristband 102 and wirelessly sends the identifier associated with the wristband 102 and the scanning device 104 identifier for the particular climb to the cloud 106 and associated servers 108 and databases 110. Alternatively, servers 108 and databases 110 may be local or otherwise communicated with over a wired line 112.

Likewise, in some embodiments, scanning device 104 sends data from wristband 102 first to a gateway (not illustrated) that then communicates with cloud 106 and servers 108. In some embodiments the gateway may connect to the climbing gym's internet and send the data on to servers 108. Some embodiments implement a Long-Range Radio (LORA) gateway to take advantage of the lower power, longer distance capabilities of LORA, but other communication networks, such as WiFi and the like, may also be used. Other communication network configurations are also possible.

Server 108 receives the data from the scanning device 104 (or gateway) and stores the climbing ascent in database 110 as would be understood by persons of ordinary skill in the art having the benefit of this disclosure. In addition to climber ID (from wristband 102) and climb or route ID, other data related to the climb may also be stored such as date, time, elapsed time of climb, rating or difficulty of route (e.g., Yosemite decimal system (YDS), or the like), number of times climbed, number and location of falls (if any), climbing speed, climbing rate over the route (i.e., to identify "cruxes" or difficult portions of route, etc.), and the like. As would be understood by persons of ordinary skill in the art having the benefit of this disclosure mounting a second scanning device 104 at the top or completion of a route enables collection of data such as successful completion (or not), elapsed time to completion, number of times completed, and the like. In some embodiments, the second scanning device 104 may include a "sent marker" icon such as a check mark, or the like, that graphically indicates a successful climb and may be in a location away from the climbing wall (e.g., a central portion of the gym) for the user to scan after a successful claim and the sent marker may simply communicate a success indicator to servers 108 that gets matched in database 110 with the climb that was scanned at the beginning. Other embodiments are also possible.

As illustrated schematically in FIG. 1, servers 108 may communicate with websites or mobile applications that users can access on their mobile devices 112 or computers 114 over a wireless or wired connection. As would be understood by persons of ordinary skill in the art having the benefit of this disclosure the mobile application and website enable, among other things, users can view their data, gym owners can view and respond to their members' data, and advertisers can target specific groups based on user's anonymized data. For example, gym operators can then use and analyze this data and respond in actionable ways such as incentivizing users with points for scanning their bracelets in return for points, gear, or classes, thereby increasing member retention. Likewise, in addition to general check in, system 100 may enable a gym to have multiple entry points to, among other things, eliminate bottlenecks and allow for greater parking distribution. Further, system 100 enables controlled (e.g., age or gender based) entry into training areas, saunas, alcohol serving areas, and the like. Embodiments of system 100 may also be used for payment for snacks, beverages, chalk, equipment, etc., and may be used to incorporate various discounts based on membership (i.e., Annual, Monthly, etc.). Embodiments of system 100 may also enable collective rating of routes in terms of difficulty, quality, etc., and retention of subjective descriptions to enable, among other things, feedback to gym owners and route setters, or to those interested in trying a route, but unsure of a route's characteristics. Additionally, system 100 enables gyms to hold competitions—most grade-points in a day, hardest route this month, etc.—and to quickly identify their grade and use distribution—ensuring their members are adequately set for and dispersed about the gym. Other uses are also possible.

As disclosed herein, climbers typically care a lot about whether they successfully complete a climb or fall. Therefore, in use a climber scans their wristband 102 the first time, the system logs an attempt. Some embodiments may have supplemental scanning devices 104 (e.g., at the top or completion of a route), cameras 116 (e.g., video), or other monitoring (e.g., audio) that can be used to log a successful completion, or send, of a route. For example, when a climber scans at the scanning device 104 at the start (bottom) of a climb, the system 100 knows which climbing route the user is attempting, and if the climber then scans their wristband 102 with one of these supplemental scanners 104 (e.g., at the top or completion of the route), the system 100 marks the last attempt as a successful ascent. In other embodiments, users can also receive a notification or prompt on their phone 112 (e.g., did you complete the climb—yes/no) that they can then tap to log a successful ascent. Other embodiments are also possible.

As will also be apparent to those of ordinary skill in the art having the benefit of this disclosure, in addition to members logging their ascents, gyms can use the scanners to have members check-in for things like events or to other areas of the gym (e.g., exercise equipment rooms, etc.). As disclosed above, gyms can then use system 100 to analyze all this data and respond in actionable ways (e.g., incentivize users with points, etc.) The system 100 may also be used to provide a user safety check or confirmation prior to attempting a particular climb (e.g., send a warning to a user's mobile device 112 that a particular climb is several YDS ratings above her typical climbs). Likewise, climbing partners (belayers) may scan a wristband 102 to verify the belayer's qualification to belay on the route (e.g., a digital "belay tag"), and a climber may scan to verify interactions with auto-belay devices to verify proper set up prior to climbing. System 100 also enables gym capacity management (e.g., tracking the number of climbers in the gym at any given time), customer engagement (e.g., providing personalized recommendations for climbs based on their past performance), route planning and setting (e.g., data used to inform route setting decisions, ensuring that new routes are challenging but still accessible to the gym's customer base), maintenance and equipment monitoring (e.g., tracking how frequently certain routes or equipment are used to plan and schedule maintenance and repairs). Other applications are also possible.

As will also be apparent advertisers and merchants may use the data from system 100 to send targeted advertising to users of the website or mobile application based on anonymized data collected when users log ascents or check-in using the system 100. Advertisers will be able to send advertisements to specific users based on their climbing ability level, time spent at the gym, location, and other analytics that can be calculated from their use of the system 100.

Figure 2A:
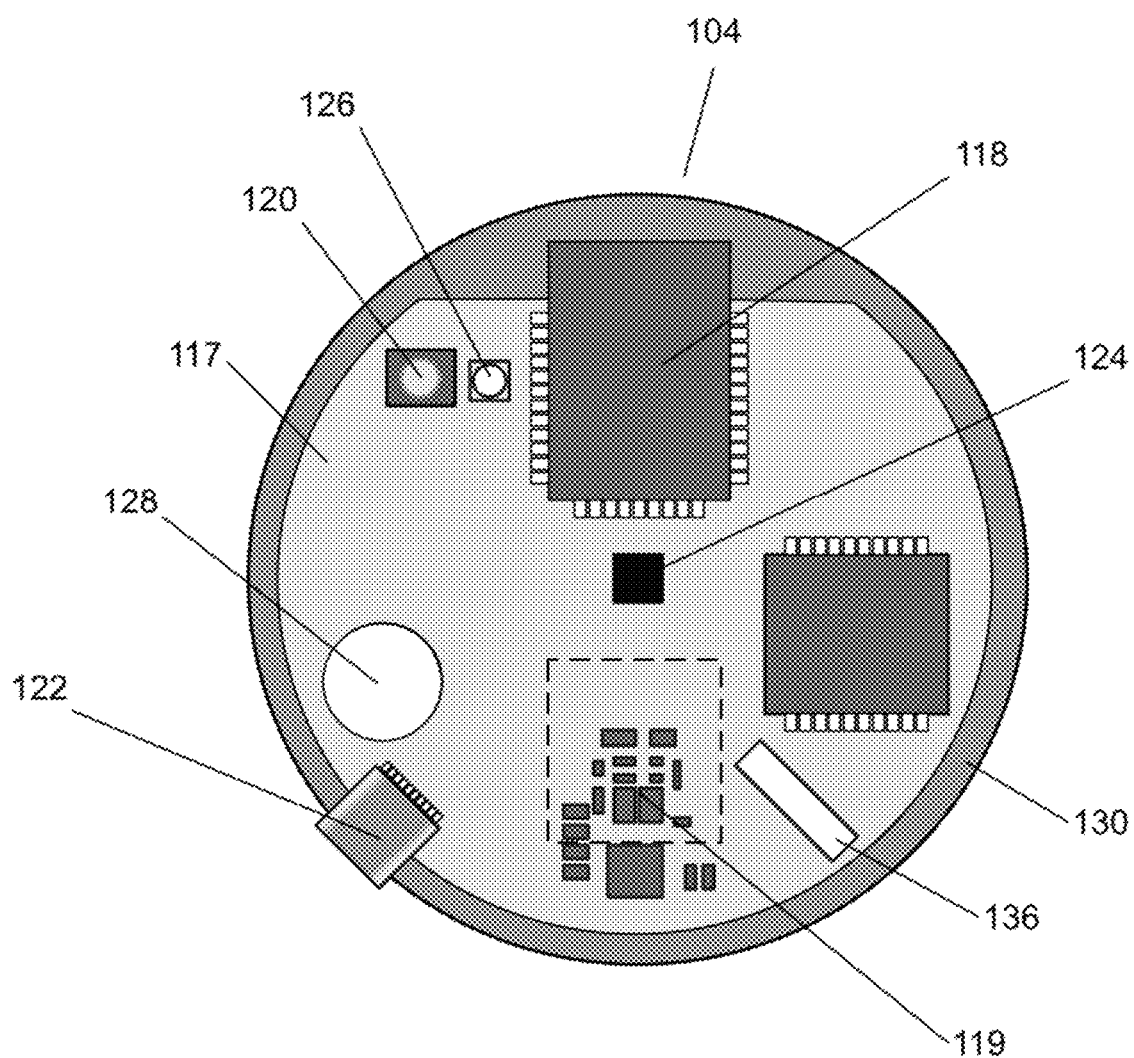
FIG. 2A is a partially transparent schematic view of a scanning device in accordance with disclosed embodiments.

FIG. 2A is a partially transparent schematic view of a scanning device 104 in accordance with disclosed embodiments. While illustrated as generally circular in shape, scanning device 104 need not be any particular shape and could be rectangular, square, octagonal, or any other shape as desired and may also incorporate a gym's logo, an advertisement, or the like. As illustrated a circuit board 117 is located behind a cover 130. Embodiments of cover 130 may include a color or symbol grade code (e.g., indicating route difficulty), a YDS grade code (e.g., 5.10, 5.11, etc.), a route name, a circuit number (i.e., groupings of multiple routes/boulders of similar difficulty that climbers attempt in a session), a route quality rating, the number of successful ascents, the date of route setting or date of intended removal, a consensus grade within the gym community, or the like.

Embodiments of circuit board 117 include the various components to operate the scanning device 104 and may include a microcontroller 118 (e.g., an ESP32 microcontroller or the like), an RFID circuit 119, a reset button 120 to allow resetting of microcontroller 118 when desired, a USB port 122 to enable diagnostics or reprogramming of controllers, charging of battery 132 (shown in FIG. 3), and the like, a motion sensor 124 to enable reduced power consumption when no motion (or light) is detected for a predetermined time, one or more LEDs 126, or other indicators, to indicate a scanning device 104 status (e.g., scan of wristband sent, power off, etc.), and other associated circuitry. Also included is a mounting hole 128 which may be sized and configured to allow bolts that are also usable to mount climbing holds to mount the scanning device 104 to appropriate locations on a climbing route as disclosed herein. FIG. 2B is another embodiment of circuit board 117 in accordance with disclosed embodiments.

Figure 3A:
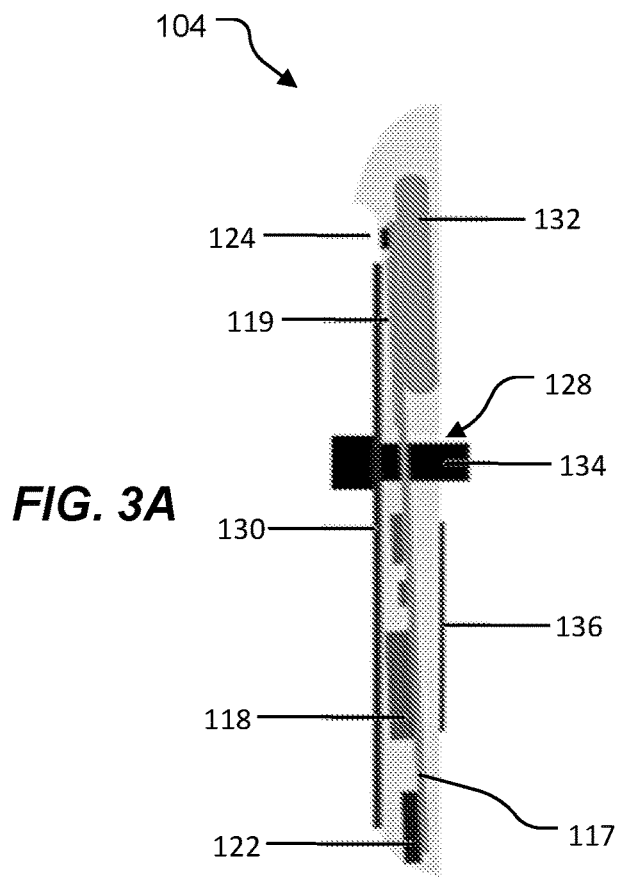
FIG. 3A is a cross-sectional side-view of the scanning device of FIG. 2A in accordance with disclosed embodiments.

FIG. 3A is a cross-sectional side-view of the scanning device 104 of FIG. 2A in accordance with disclosed embodiments. As viewable in cross-section, a battery 132 may be mounted on the back side of circuit board 117 and a bolt 134 is shown in mounting hole 128. Embodiments of scanning device 104 may also include a QR code 138 on the back side for used to link the scanning device 104 to climbs or users as follows. In some embodiments, the setters (i.e., employees who put the climbs up) in the gym can scan the QR code 138 to link this specific scanning device 104 to a specific climb in the gym. Alternatively, setters may use their wristband 102 to link the climb they just put up in system 100. In other embodiments, the QR code 138 may be mounted on front of scanning device 104 (or some other accessible portion) and climbers can use the QR code 138 to open up the information about the specific climb with their devices (e.g., 112, 114). Alternatively, climbers can also use their wristband 102 to view information about the climb. In such embodiments they user may put their account in "discover" mode using the app (e.g., on mobile device 112) so that their wristband 102 will not log an ascent when they scan it and instead will pull up information about the climb. Other embodiments are also possible.

FIG. 3B is a schematic front view of a scanning device 104 with a ring-type configuration in accordance with disclosed embodiments. As indicated a ring 140 may be used for mounting a modular scanning device 142 (i.e., containing circuit board 117 and related, above-described components within). Ring 140 may have keys 138 that align with notches on modular scanning device 142 (or vice versa) and may be color coded or the like to indicate route difficulty, etc., as disclosed herein. FIG. 3C is a cross-sectional view of the scanning device 104 of FIG. 3B in accordance with disclosed embodiments.

As disclosed above, embodiments of scanning device 104 may be battery 132 powered so that the employees of the gym that put up the climbing route can easily move them around and they can easily be added to current gyms without the need for additional wiring. Alternatively, scanning device 104 may be powered by existing gym power sources, such as wiring for lighting and the like.

In some embodiments it is desirable to allow the scanning device 104 to minimize power usage by turning on and scanning upon the occurrence of predetermined conditions. For example, as disclosed above, the scanning device 104 may have a low powered motion sensor 124. Normally, the scanning device 104 is in low power mode. When a user moves their wristband 102 near the scanning device 104, the motion sensor 124 registers the motion and turns the RFID scanner circuit 119 on. The RFID circuit 119 reads the wristband 102 ID and then turns off. Then, a LORA or other antenna turns on and sends the wristband 102 ID and climb ID to a LORA or other gateway as disclosed herein. After the IDs are sent, the scanning device 104 goes back into low power mode. Other power minimization techniques are also possible.

Figure 4A:
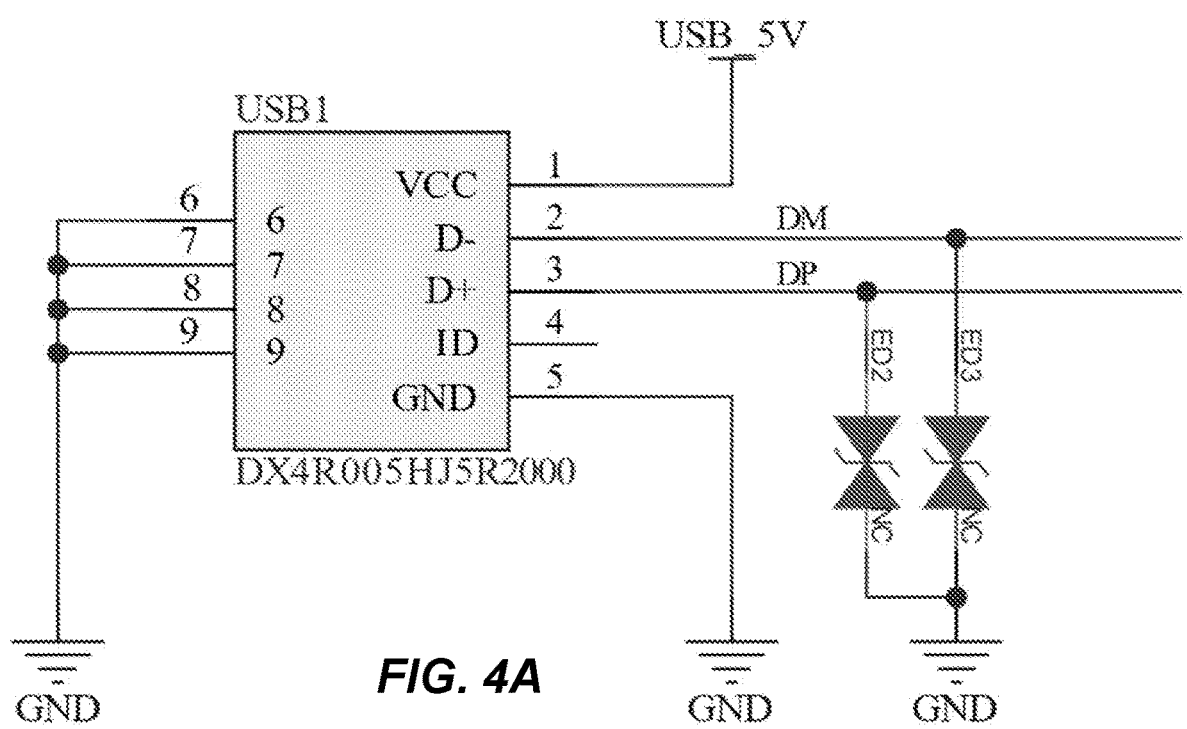
FIGS. 4A-4I are exemplary circuit diagrams for circuits usable with system 100 in accordance with disclosed embodiments.
Figure 4B:
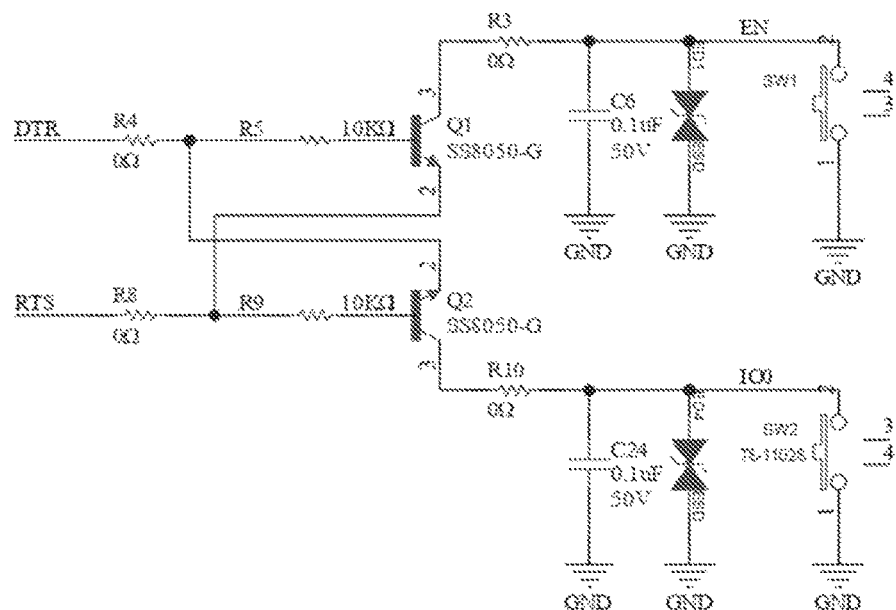
Figure 4C:
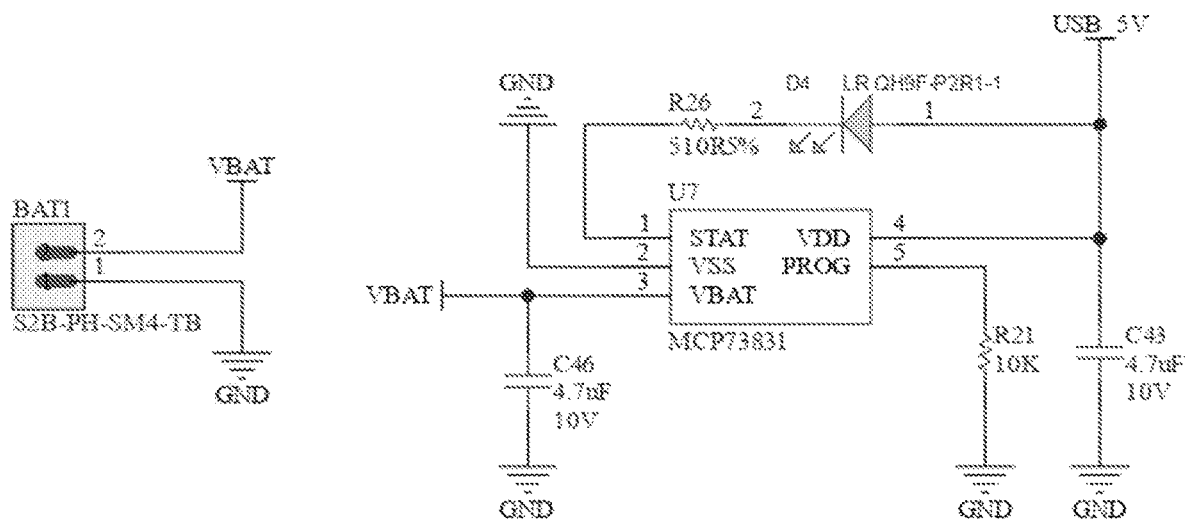
Figure 4D:
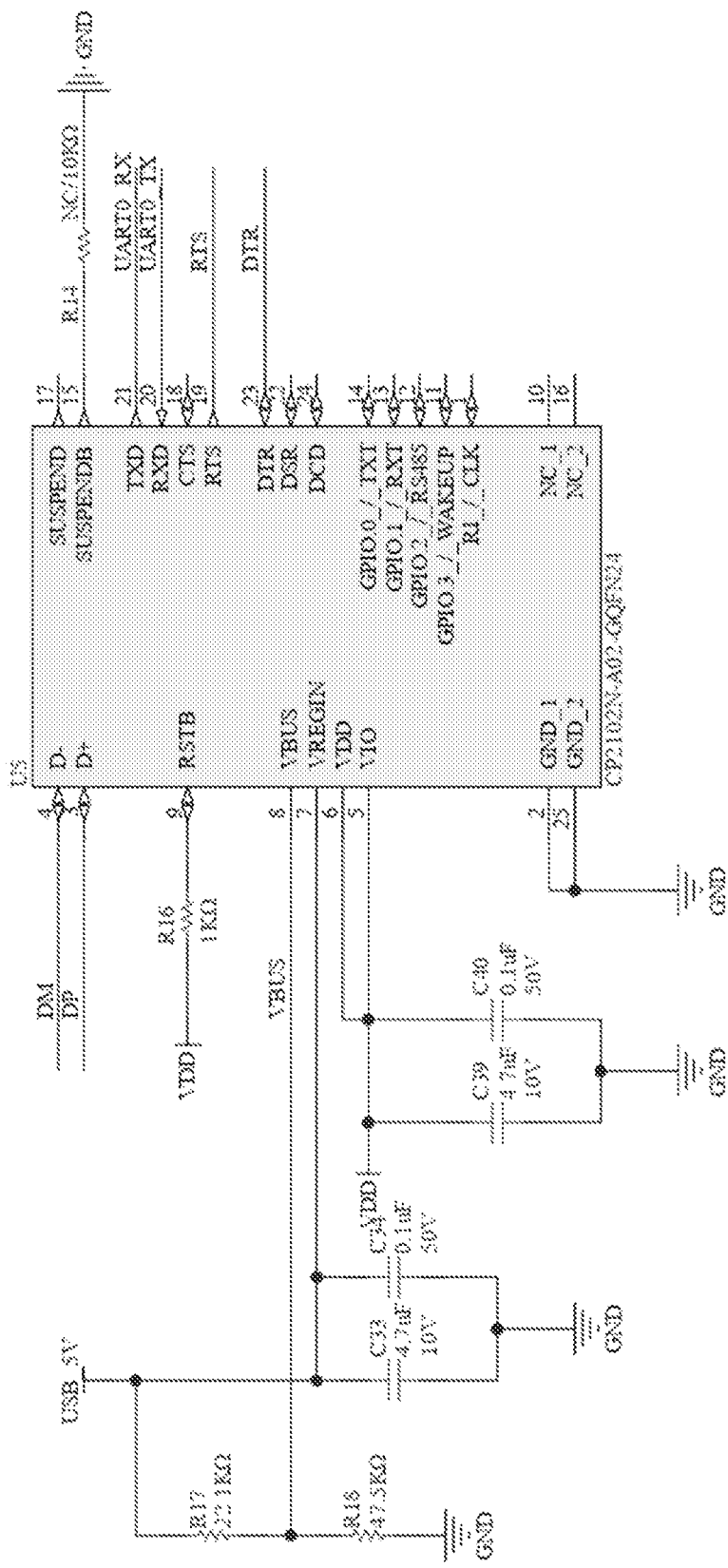
Figure 4E:
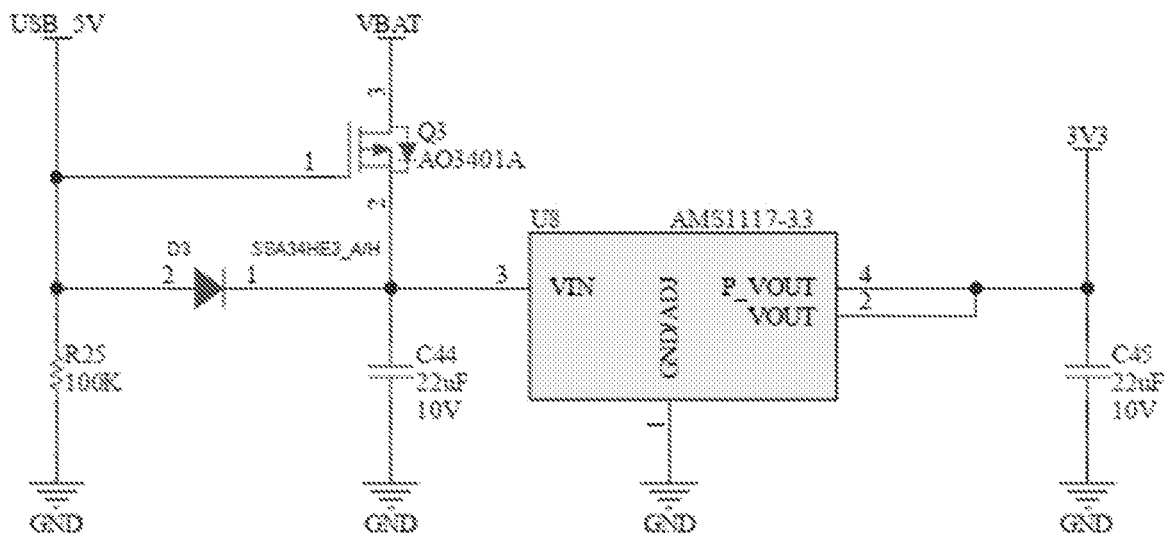
Figure 4F:
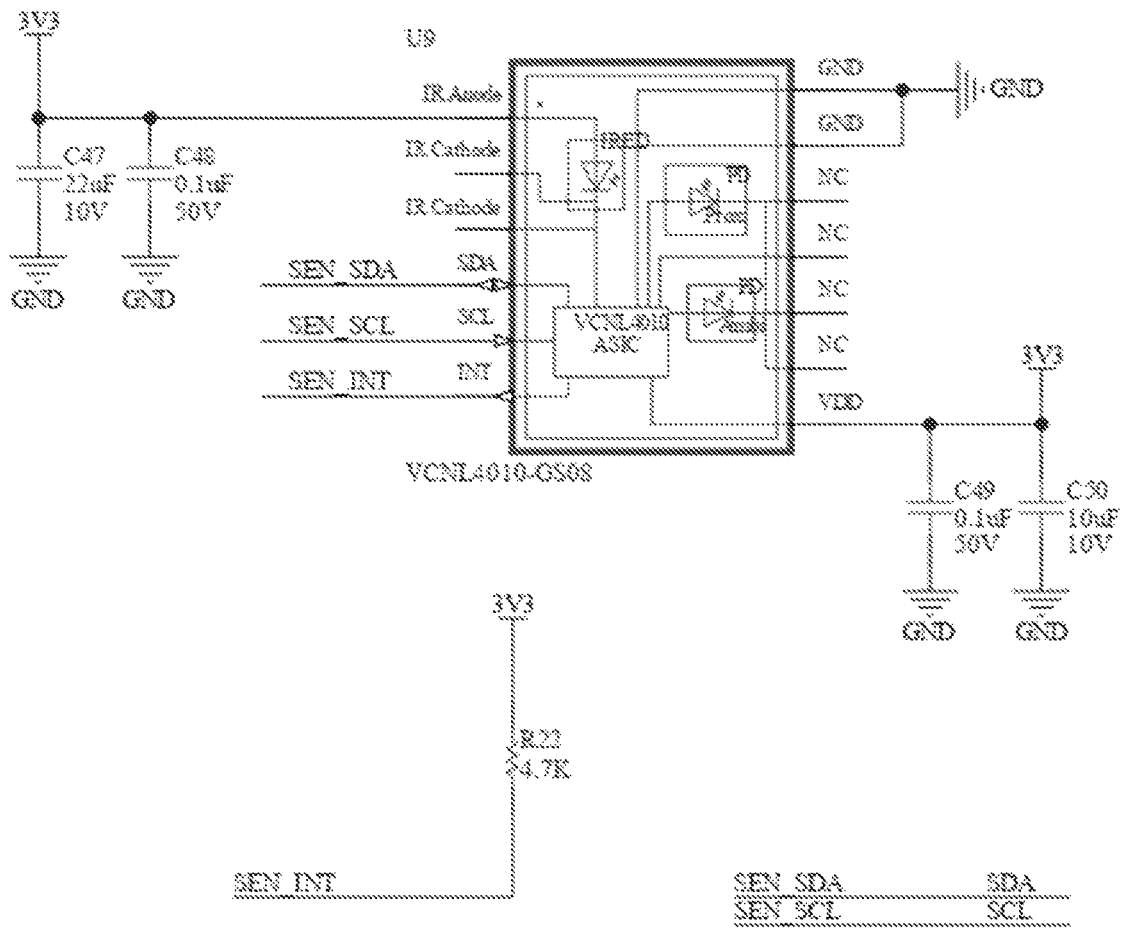
Figure 4G:
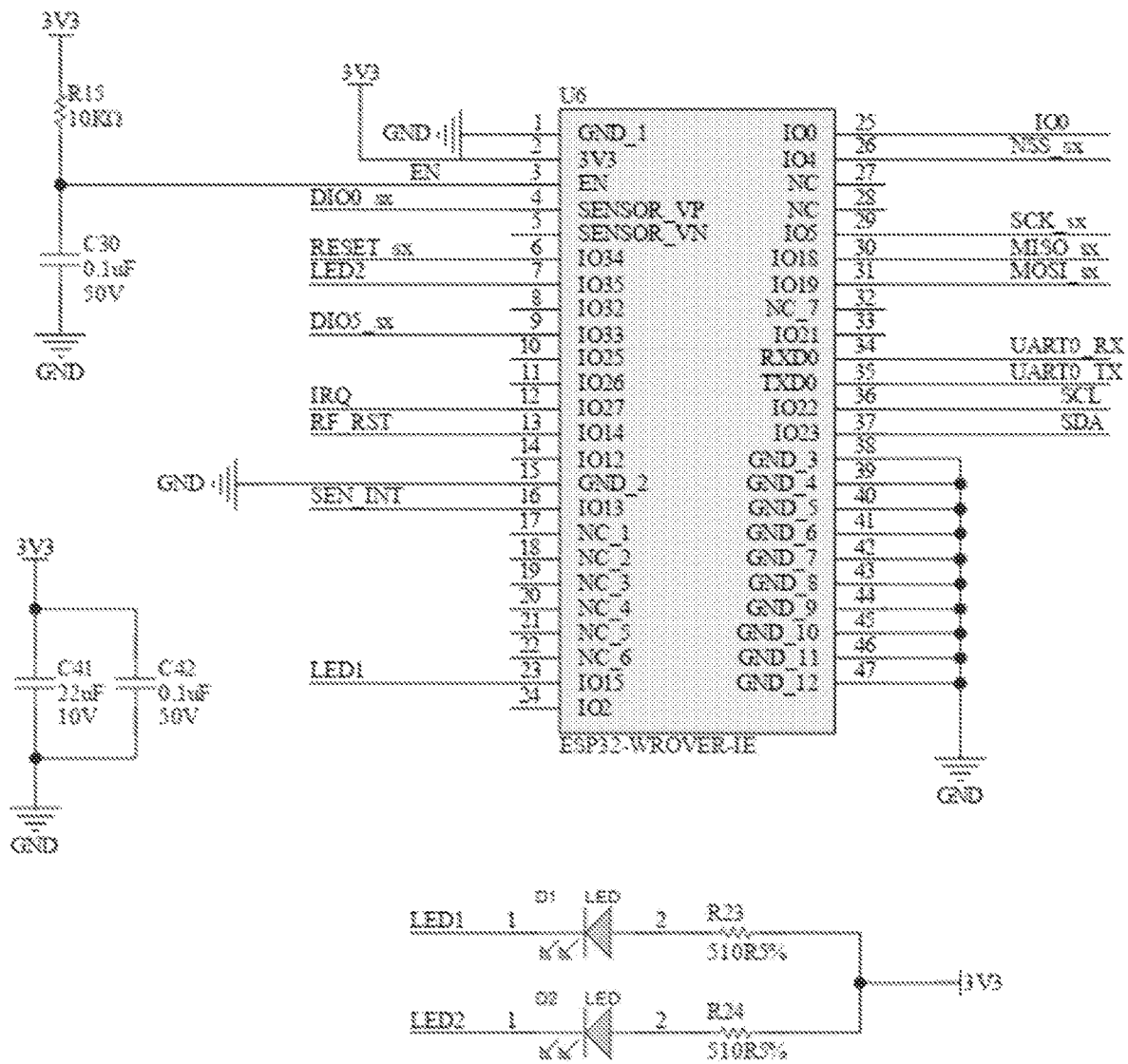
Figure 4H:
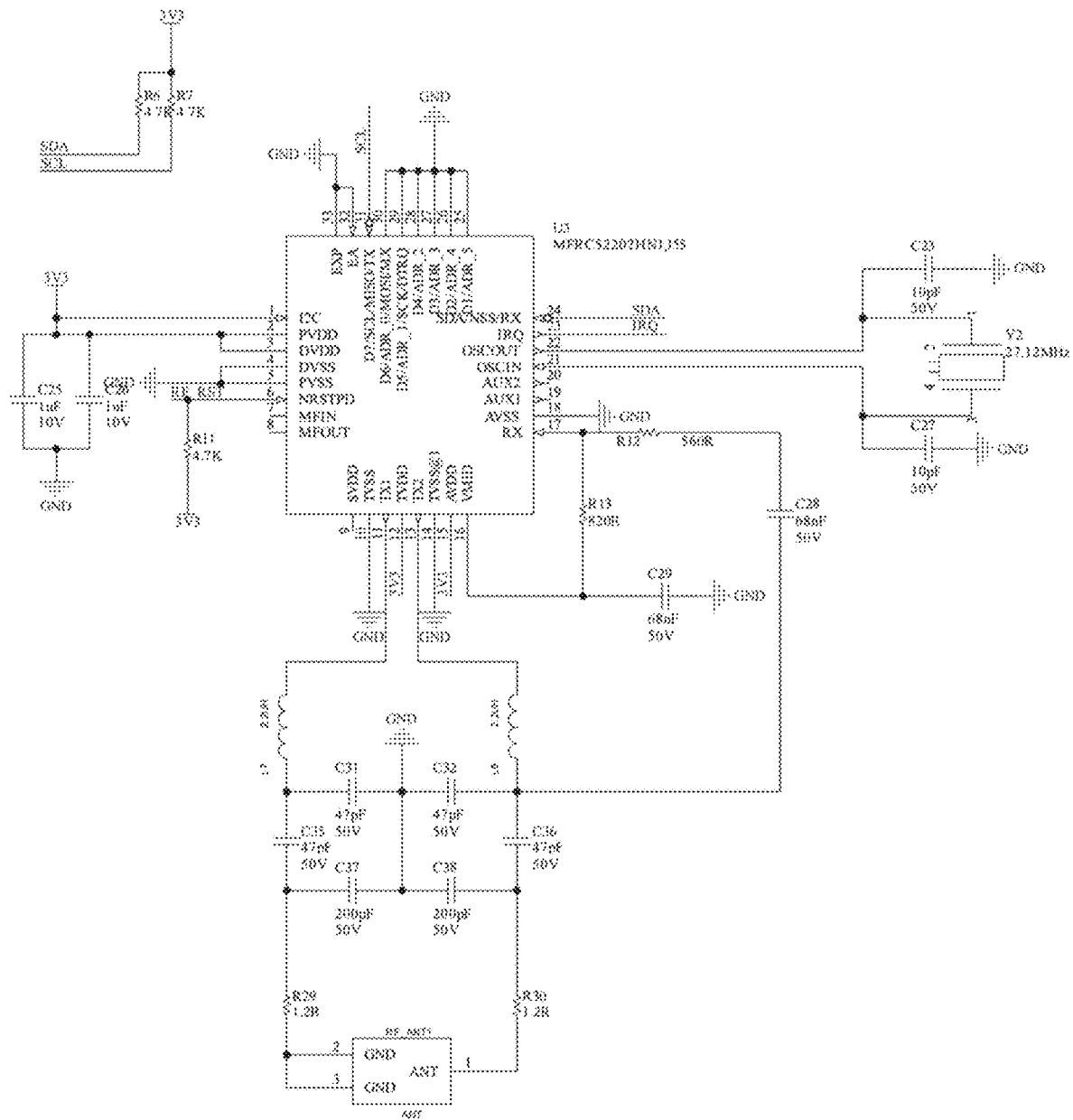
Figure 4I:
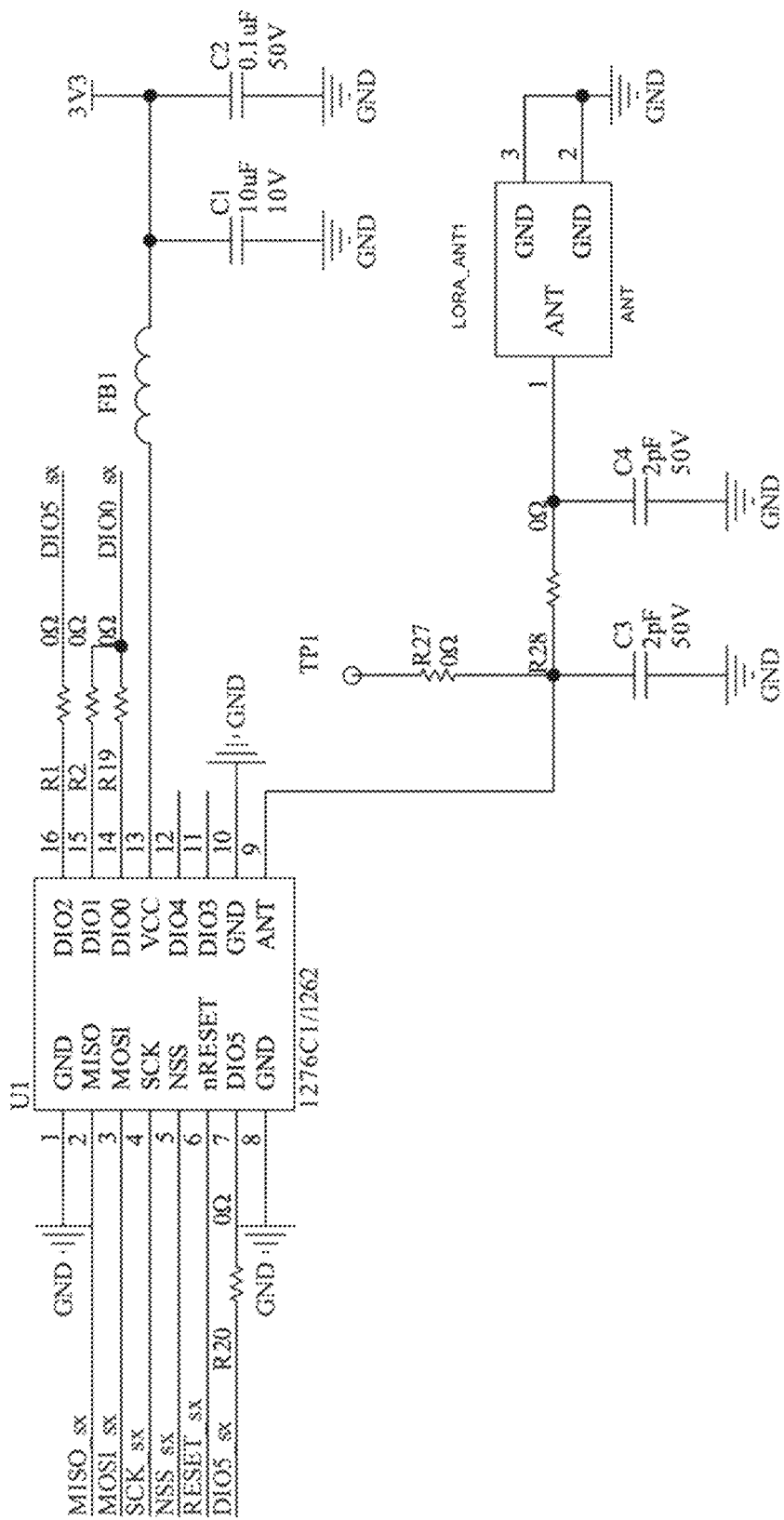

FIGS. 4A-4I are exemplary circuit diagrams for circuits usable with system 100 in accordance with disclosed embodiments. FIG. 4A is an exemplary circuit for a USB port (e.g., USB port 122). FIG. 4B is an exemplary circuit for a reset button (e.g., reset button 120). FIG. 4C is an exemplary circuit for battery recharging (e.g., battery 132). FIG. 4D is an exemplary circuit for sending or receiving serial data from a USB port into serial data that can be received or sent by a universal asynchronous receiver-transmitter (UART) interface. FIG. 4E is an exemplary circuit for 3V regulation. FIG. 4F is an exemplary circuit for a motion sensor (e.g., motion sensor 124). FIG. 4G is an exemplary circuit for a microcontroller (e.g., microcontroller 118). FIG. 4H is an exemplary circuit for RFID operations (e.g., RFID circuit 119). FIG. 4I is an exemplary circuit for LORA operations. Other circuits are also possible.

Although various embodiments have been shown and described, the present disclosure is not so limited and will be understood to include all such modifications and variations would be apparent to one skilled in the art.

What is claimed is:

1. A system for tracking a progress of each particular user of a plurality of users through a climb at a climbing facility, the system comprising:
   each particular transmitter of a plurality of transmitters, worn by said each particular user, that wirelessly transmits a user identification (user ID) that is unique to said each particular user;
   a scanning device, attached to a surface near a start of the climb within the climbing facility, that receives the wirelessly transmitted user ID of said each particular user and communicates an individual climb data of said each particular user comprising the user ID and a climb identifier of said each particular user to at least one server device comprising instructions to cause the least one server device and related data processing and storage apparatus to operate, sum and to store the individual climb data of said each particular user as the stored climb data of all the plurality of users; and
   wherein the at least one server device further comprises instructions to enable communication of the stored climb data to a user device and to a climbing facility operator device wherein the climbing facility operator device processes the stored climb data of the plurality of users to form an aggregate the individual climb data of said each particular user to provide a climbing facility operator information, wherein the climbing facility operator information is to use for incentivizing or rewarding other activities of the plurality of users at the climbing facility.

2. The system of claim 1 wherein said each particular transmitter comprises a radio frequency identification (RFID) transmitter.

3. The system of claim 1 wherein the said each particular transmitter comprises a wristband.

4. The system of claim 1 wherein the stored climb data further comprises one or more of a date, a time of day, an elapsed time of completion of the climb, or a rating or difficulty indicator of the climb.

5. The system of claim 1 further comprising at least one camera that communicates images related to the progress of said each particular user through the climb to the at least one server device.

6. The system of claim 1 wherein the scanning device communicates with the at least one server device with a long-range radio (LORA) transmitter.

7. The system of claim 1 further comprising a power conservation circuit that comprises a proximity sensor.

8. The system of claim 7 wherein the proximity sensor powers on the scanning device when motion is detected by the proximity sensor.

9. The system of claim 7 wherein the proximity sensor powers off the scanning device when motion is not detected by the proximity sensor for a predetermined time period.

10. The system of claim 1 wherein the stored climb data further comprises one or more of safety check information, belayer qualification information, or equipment setup information.

11. The system of claim 1 wherein the at least one server device further comprises instructions to cause the least one server device and the related data processing and the storage apparatus to operate and to process the user ID to track a number of climbers using the system.

12. The system of claim 1 wherein the at least one server device further comprises instructions to cause the least one server device and the related data processing and the storage apparatus to operate and to process the user ID and the stored climb data to provide one or more of recommendations for climbs, rewards, or advertising.

13. The system of claim 1 wherein the at least one server device further comprises instructions to cause the least one server device and the related data processing and the storage apparatus to operate and to process the aggregate the individual climb data of said each particular user for route planning and setting or maintenance and equipment monitoring.

14. The system of claim 1 wherein the scanning device further comprises a mounting ring that secures a modular scanner in place.

15. The system of claim 1 wherein the scanning device further comprises a climb grade code indicator.

16. The system of claim 1 wherein the incentivizing or rewarding other activities of the plurality of users at the climbing facility comprises one or more of: enabling a purchase of gear or classes, enabling location-specific entry, and enabling discounts on membership.

* * * * *